United States Patent
Krebs et al.

(10) Patent No.: US 9,695,871 B2
(45) Date of Patent: Jul. 4, 2017

(54) AUXILIARY BEARING FOR MAGNETICALLY SUSPENDED ROTOR SYSTEM

(71) Applicants: SKF Magnetic Mechatronics, Saint-Marcel (FR); Aktiebolaget SKF, Göborg (SE)

(72) Inventors: Philipp Krebs, Gerolstein (DE); Jens Anders, Vernon (FR); Eddy Herisse, Les Andelys (FR); Frederic Ponson, Luynes (FR)

(73) Assignees: SKF MAGNETIC MECHATRONICS, Saint-Marcel (FR); AKTIEBOLAGET SKF, Gothenburg (SE)

(*) Notice: Subject to any disclaimer, the term of this patent is extended or adjusted under 35 U.S.C. 154(b) by 428 days.

(21) Appl. No.: 14/290,199

(22) Filed: May 29, 2014

(65) Prior Publication Data
US 2014/0354098 A1    Dec. 4, 2014

(30) Foreign Application Priority Data
May 29, 2013 (EP) ..................... 13305701

(51) Int. Cl.
*F16C 32/04* (2006.01)
*F16C 39/02* (2006.01)
(Continued)

(52) U.S. Cl.
CPC ........ *F16C 32/0402* (2013.01); *F16C 23/041* (2013.01); *F16C 32/047* (2013.01);
(Continued)

(58) Field of Classification Search
CPC . H02K 7/09; F16C 23/02; F16C 23/04; F16C 23/041; F16C 23/043; F16C 23/045;
(Continued)

(56) References Cited

U.S. PATENT DOCUMENTS 4,191,238 A * 3/1980 Pichl ................ B22D 19/02
164/100
5,518,319 A 5/1996 Selby
(Continued)

FOREIGN PATENT DOCUMENTS

DE          66534 A   *  4/1969
DE   102010052101 A1 *  5/2012  ............ F16C 19/183
(Continued)

*Primary Examiner* — Michael Andrews
*Assistant Examiner* — Robert E Mates
(74) *Attorney, Agent, or Firm* — Bryan Peckjian; SKF USA Inc. Patent Dept.

(57) ABSTRACT

An assembly that includes a rotating shaft supported with respect to a stationary housing by at least one active magnetic bearing presenting a mean radial air gap and at least one auxiliary bearing having a bushing fixed to the housing and a sleeve fixed on the rotating shaft. The bushing and the sleeve have opposite surfaces that define a clearance (E2) which is less than the mean radial air gap (E1). The bushing and the sleeve each exhibit symmetry around a longitudinal axis of the shaft and have different profiles in a longitudinal cross-section including the longitudinal axis to optimize the contact pressure distribution when the rotating shaft lands on the auxiliary bearing.

21 Claims, 5 Drawing Sheets

(51) Int. Cl.
  *F16C 23/04* (2006.01)
  *F16C 33/06* (2006.01)
  *H02K 7/09* (2006.01)

(52) U.S. Cl.
  CPC ...... *F16C 32/0442* (2013.01); *F16C 32/0474* (2013.01); *F16C 33/06* (2013.01); *F16C 39/02* (2013.01); *F16C 2240/40* (2013.01); *F16C 2360/44* (2013.01); *H02K 7/09* (2013.01)

(58) Field of Classification Search
  CPC  F16C 32/0402; F16C 32/0442; F16C 32/047; F16C 32/0474; F16C 33/06; F16C 39/02; F16C 2240/40; F16C 17/02; F16C 17/24; H02N 15/00
  USPC .................................. 310/90, 90.5; 384/192
  See application file for complete search history.

(56) References Cited

U.S. PATENT DOCUMENTS

| | | | |
|---|---|---|---|
| 6,390,685 B1 * | 5/2002 | Shimomura | 384/535 |
| 9,080,602 B2 * | 7/2015 | Pausch | F16C 19/183 |
| 2002/0126924 A1 | 9/2002 | Okamoto et al. | |
| 2006/0208589 A1 * | 9/2006 | Foshage | F16C 17/024 |
| | | | 310/90 |
| 2010/0254641 A1 | 10/2010 | Hoppe | |
| 2012/0063918 A1 * | 3/2012 | de Larminat | F16C 19/52 |
| | | | 417/1 |

FOREIGN PATENT DOCUMENTS

| | | | | |
|---|---|---|---|---|
| GB | 971539 A | * | 9/1964 | ............. F16C 43/02 |
| GB | 1380947 A | * | 1/1975 | ............. B21B 31/07 |

* cited by examiner

AUXILIARY BEARING FOR MAGNETICALLY SUSPENDED ROTOR SYSTEM

CROSS-REFERENCE TO RELATED APPLICATIONS

This application claims priority to European Patent Application EP13305701.8 filed May 29, 2013, which is herein fully incorporated by reference.

FIELD OF THE INVENTION

The present invention relates to an auxiliary bearing for a magnetically suspended rotor system and to a magnetic suspension incorporating such auxiliary bearing.

BACKGROUND OF THE INVENTION

Magnetic bearings operate without mechanical friction, but require continuous supply with electrical power. In case of a power failure, the shaft needs to be supported by a so-called auxiliary bearing, which is also called landing bearing, emergency bearing or back-up bearing.

Thus rotary machines equipped with active magnetic bearings include mechanical auxiliary bearings which act if one of the magnetic bearings is overloaded or if the electrical or electronic control circuit fails or else in the event of stoppage or of suspension overload.

An auxiliary device provides mechanical redundancy and needs to be defined and dimensioned correctly so as to fully guarantee that the machine will not be damaged and that the equipment can recover immediately once the overload or servo-control failure has disappeared.

Rolling element bearings which are generally dry-lubricated or sleeve-bushing combinations (smooth rings) can be used for constituting auxiliary bearings.

More specifically auxiliary bearings using rolling element bearings may use ceramic rolling element bearings. However such bearings are very costly and moreover require a lot of space.

Auxiliary plain bearings having smooth surfaces, in particular auxiliary bearings using sleeve-bushing combinations have various drawbacks. In particular sleeves have typically insufficient load carrying capacity and cannot handle high sliding speeds. Due to the air gap of the magnetic bearing, it cannot be predicted if the shaft will drop in such a way that it is axially aligned with the center axis of the bushing. It could happen that the shaft and the bushing are misaligned instead of being coaxial. This creates very high contact pressures on the edges of the sleeve which is mounted on the shaft. Therefore, the use of sleeves is often avoided.

Rotors mounted on magnetic bearings often present nominal speeds which are very high. Under such circumstances, in the event of the rotor landing on the auxiliary bearings due to a failure of control or power supply, the rotor presents whirling movements at its speed of rotation with eccentricity which is then defined by the clearance of the auxiliary bearing. Under such circumstances, a very high degree of unbalance can arise leading to destruction of the bearings or to deformation of the rotor.

Figure 1:
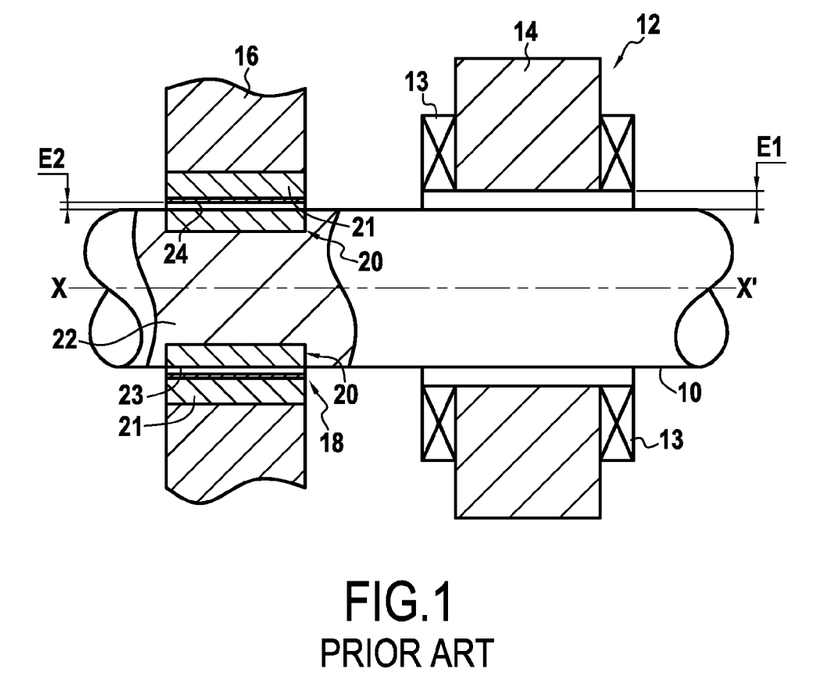
FIG. 1 is a side elevation, partially sectioned, of a known assembly comprising a rotating shaft mounted within a magnetic bearing and an auxiliary bearing.

FIG. 1 shows an example of a conventional radial magnetic bearing 12 for supporting a rotating shaft 10. The magnetic bearing 12 comprises a stator constituting an electromagnet and including a ferromagnetic core 14 and coils 13. An air gap E1 is defined between the stator 13, 14 and the peripheral outer surface of the shaft 10, which constitutes a rotor armature.

An auxiliary bearing 18 of the sleeve-bushing type comprises a sleeve 20 which may be for example press-fitted on a reduced diameter cylindrical part 22 of the shaft 10. A bushing 21 is mounted in a housing 16 and has a cylindrically-shaped layer secured to the housing 16 and being coaxially disposed with respect to the sleeve 20. A clearance E2 is defined between an inner cylindrical surface 24 of the bushing 21 and an outer cylindrical surface 23 of the sleeve 20.

The clearance E2 between the opposing surfaces 23, 24 of the auxiliary bearing 18 may be for example between 0.2 and 0.3 millimeter and is smaller than the air gap E1 of the magnetic bearing 12, which may be for example between 0.4 and 0.6 millimeter. Usually the clearance E2 is about half the air gap E1.

In the conventional auxiliary bearings of the sleeve-bushing type such as the auxiliary bearing 18, the opposing surfaces 23, 24 define a rectilinear profile in a longitudinal axial cross-section as shown in FIG. 1. As mentioned above, when there is a failure of the magnetic bearing 12 and the shaft 10 with its sleeve 20 lands on the bushing 21, if during this landing the shaft is misaligned with the bushing, very high contact pressures are created on the edges of the sleeve.

SUMMARY OF THE INVENTION

The technical problem to be solved is therefore to remedy the above-mentioned drawbacks and in particular to reduce the wear and damage of a sleeve and a bushing of an auxiliary bearing of the sleeve-bushing type during failure of an associated magnetic bearing or when a shaft supported by an associated magnetic bearing is brought to rest.

The invention further aims at allowing the possibility of using an auxiliary bearing of the sleeve-bushing type even if a shaft is rotated at a very high rotating speed.

More generally the invention aims at allowing the possibility of using an auxiliary plain bearing having smooth surfaces including heat treated surfaces which may be either integral with a housing or a shaft or fastened with a housing or a shaft through a bushing or a sleeve.

Another aim of the present invention is to have a simplified method of manufacture of an auxiliary bearing.

The invention is defined in the appended claims.

The invention more specifically relates to an assembly comprising a rotating shaft supported with respect to a stationary housing by at least one active magnetic bearing presenting a mean radial air gap (E1) and at least one auxiliary bearing comprising on the one hand a first smooth surface integral with the housing and on the other hand a second smooth surface integral with the rotating shaft, the first and second smooth surfaces being opposite and defining a clearance (E2) which is less than the mean radial air gap (E1), characterized in that the first smooth surface and the second smooth surface each exhibit symmetry around a longitudinal axis of the shaft whilst having different profiles in a longitudinal cross-section including the longitudinal axis.

According to a specific embodiment, the first surface has a convex profile in the longitudinal cross-section, whereas the second surface has a concave profile in the longitudinal cross-section.

According to another embodiment, the first surface has a concave profile in the longitudinal cross-section, whereas the second surface has a convex profile in the longitudinal cross-section.

According to still another embodiment, the first surface has a convex profile in the longitudinal cross-section, whereas the second surface has a straight profile in the longitudinal cross-section.

According to still another embodiment, the first surface has a straight profile in the longitudinal cross-section, whereas the second surface has a convex profile in the longitudinal cross-section.

The first smooth surface may be a heat-treated surface which is directly machined on the housing.

The second smooth surface may be a heat-treated surface which is directly machined on the rotating shaft.

The first smooth surface may be a heat-treated surface which is formed on a bushing fixedly mounted on the housing.

The second smooth surface may be a heat-treated surface which is formed on a sleeve fixedly mounted on the rotating shaft.

According to a specific embodiment, the sleeve has a crowned profile.

In such a case preferably the reduction delta H of the radius of the crowned sleeve is given by the equation:

$$\text{Delta } H = h^* ((2^*u - lc)/(la - lc))^{\exp}$$

Where h is the total drop at the end of the sleeve profile
u is the distance of the point from the center of the sleeve
lc is the total length of the profiled section of the sleeve to which no modification is done
la is the total length of the profiled section of the sleeve, and
exp is an exponent larger than 1.
Preferably the value of exp is 4.

According to another specific embodiment, the sleeve has a logarithmic profile.

In such a case preferably the reduction delta H of the radius of the sleeve with logarithmic profile is given by the equation $$\text{Delta } H = h^* ((\ln(1-(2^*\min(abs(u), la/2)/l2)^{\exp})))/(\ln(1-(l1/l2)^{\exp})))$$

Where h is the total drop at the end of the sleeve profile
u is the distance of the point from the center of the sleeve
la is the total length of the profiled section of the sleeve, and
exp is an exponent larger than 1.
l1 is a factor calculated as l1=la*k1
l2 is a factor calculated as l2=la*k2
Preferred values are as follows:
k1=0.98
k2=1.02
exp=6.

The logarithmic profile results in less height deviation in the center, while giving more height deviation at the ends of the sleeve, which gives more sensitivity to misalignment but reduces contact pressure in the nominal situation.

The bushing is preferably made of a material having a hardness of a minimum of 58 on the Rockwell C-Scale and having a heat-treated surface.

The sleeve is preferably made of steel having a heat-treated surface.

The mean radial air gap (E1) is preferably between 0.2 and 0.5 mm and the clearance (E2) is preferably between 0.15 and 0.3 mm.

The invention further relates to a radial magnetic bearing device comprising an assembly as defined above.

DETAILED DESCRIPTION OF THE PREFERRED EMBODIMENTS

The present invention will be described in connection with preferred embodiments which are given by way of examples.

As already mentioned, FIG. 1 shows a typical arrangement of an assembly comprising a radial magnetic bearing 12 defining an air gap E1 and of an auxiliary bearing 18 having a bushing 21 and a sleeve 20 defining a clearance E2 there between which is less than the mean air gap E1. During normal operation, the shaft 10 is supported by the magnetic bearing 12 without contact with the stator 13, 14 of the magnetic bearing 12 and with the bushing 21 of the auxiliary bearing 18, whereas in case of a failure in the operation of the magnetic bearing 12, such as a power failure, the sleeve 20 of the shaft 10 lands on the bushing 21 of the auxiliary bearing 18. When the sleeve 20 and bushing 21 both have the same conventional cylindrical shape with a symmetry around the longitudinal axis of the shaft 10 whilst having the same straight profile in a longitudinal cross-section including the longitudinal axis X-X', they cannot support high loads and cannot handle high sliding speeds. In particular due to the air gap of the magnetic bearing 12, it cannot be predicted if the shaft 10 will drop in such a way that it is axially aligned with the center axis of the bushing 21. It could happen that the shaft 10 is misaligned with the bushing 21. This creates very high contact pressures on the edges of the sleeve 20.

According to the invention, the assembly of FIG. 1 is modified in such a way that the bushing 21 and the sleeve 20 each exhibit symmetry around the longitudinal axis of the shaft 10 whilst having different profiles in a longitudinal cross-section including this longitudinal axis X-X'. Thus the bushing 21 and the sleeve 20 have different profiles which are defined to optimize the contact pressure distribution in the auxiliary bearing 18 when the shaft 10 is no more supported by the magnetic bearing 12 and drops, even if the shaft 10 is not axially aligned with the center axis of the auxiliary bearing 18. The invention thus aims at limiting the contact pressures on the sleeve 20 of the auxiliary bearing 18 even if the shaft 10 is misaligned with the bushing 21.

Figure 2:
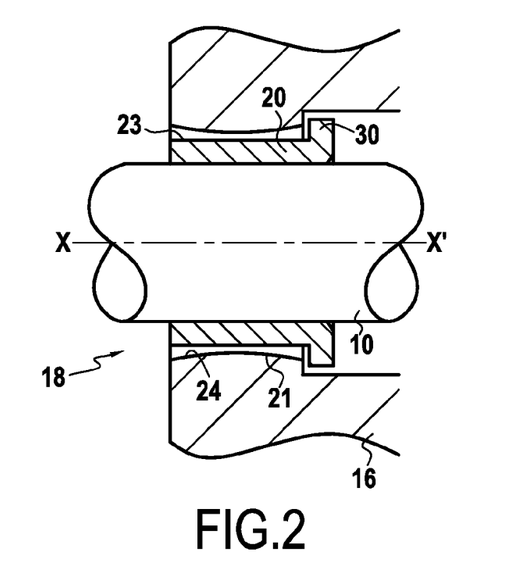
FIG. 2 shows another example of a longitudinal cross-section of an auxiliary bearing which may be achieved according to the present invention.

FIG. 2 is a longitudinal cross section of an auxiliary bearing 18 according to the invention with a rotating sleeve 20 having an outer surface 23 and a stationary bushing 21 having an inner surface 24. The auxiliary bearing 18 of FIG. 2 shows a sleeve 20 with a flange 30, but this is not a limitation and other embodiments are possible. In the embodiment of FIG. 2, the surfaces 23 and 24 defining a clearance there between have different profiles along the longitudinal axis X-X' of the shaft 10.

FIGS. 3 to 7 illustrate different possible embodiments of auxiliary bearings comprising a static bushing 21 and a rotating sleeve 20 with different profiles. In the drawings the magnitude of the convexity or of the concavity is exaggerated to better illustrate the core of the invention.

Figure 3:
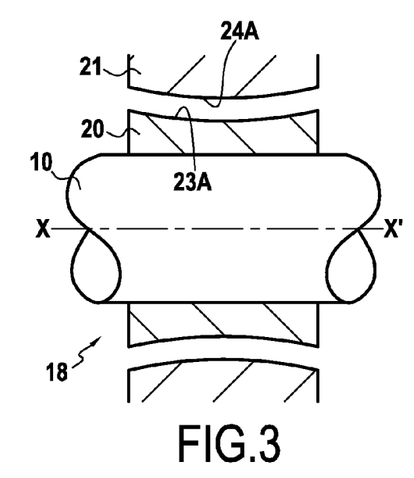
FIGS. 3 to 7 are schematic views of several embodiments of differently profiled longitudinal cross-sections of the sleeve and bushing of an auxiliary bearing according to the present invention.

FIG. 3 shows an auxiliary bearing 18 with a sleeve 20 having a surface 23A with a concave profile and a bushing 21 having a surface 24A with a convex profile. To enable the system to be assembled care should be taken that the largest outer diameter of the rotor sleeve 20 (including the mechanical tolerances) is smaller than the smallest diameter of the stator bushing 21.

Figure 4:
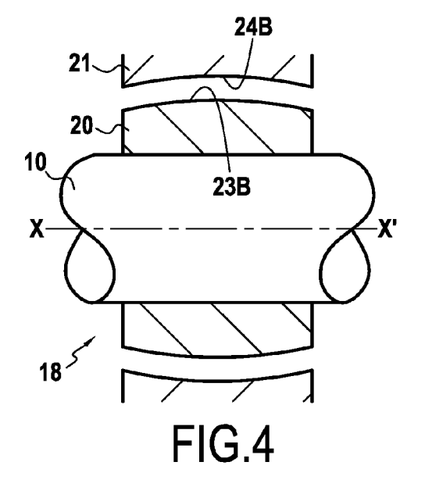

FIG. 4 shows an auxiliary bearing 18 with a sleeve 20 having a surface 23B with a convex profile and a bushing 21 having a surface 24B with a concave profile. The constraints mentioned with reference to FIG. 3 apply accordingly.

Figure 5:
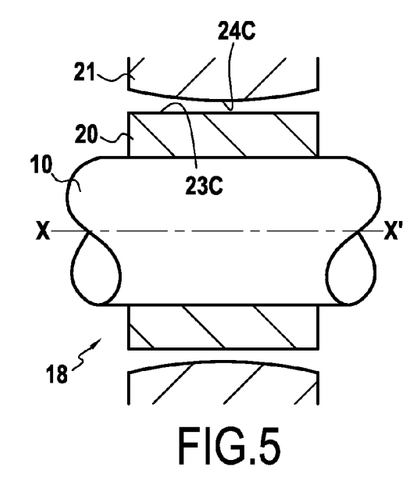

FIG. 5 shows an auxiliary bearing 18 with a sleeve 20 having a surface 23C with a straight profile and a bushing 21 having a surface 24C with a slightly convex profile. The radius of the convex surface is chosen so that the edge of the bushing 21 is never in contact with the sleeve 20.

Figure 6:
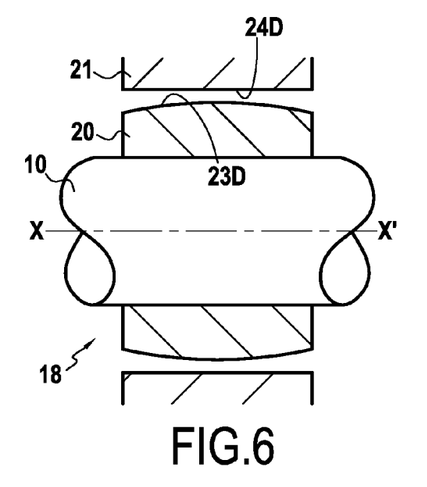

FIG. 6 shows an auxiliary bearing 18 with a sleeve 20 having a surface 23D with a convex profile and a bushing 21 having a surface 24D with a straight profile. The radius of the convex surface is chosen so that the edge of the sleeve 20 is never in contact with the bushing 21.

Figure 7:
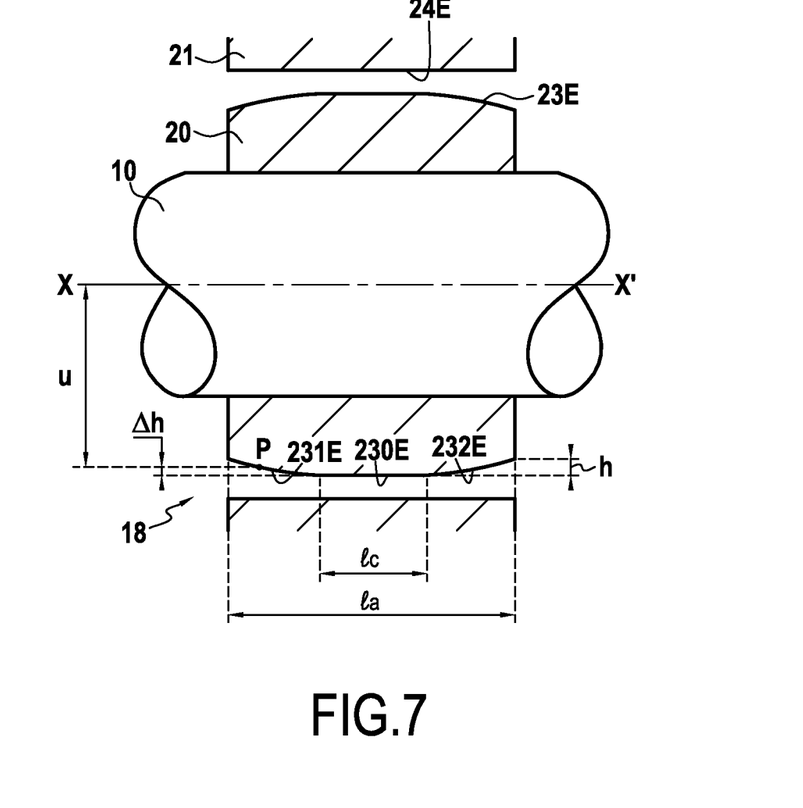

FIG. 7 shows an auxiliary bearing 18 with a sleeve 20 having a surface 23E with a crowned profile and a bushing 21 having a surface 24E with a straight profile. This is a preferred embodiment.

An embodiment such as the configuration shown in FIG. 7 will be described with more details here-below. However, a crowned profile could also be applied for example to the embodiment illustrated in FIG. 5 (sleeve 20 with a straight profile and bushing 21 with a convex profile).

The magnitude of the crowning is defined by the following formula:

$$\Delta H = h^*((2^*u - lc)/(la - lc))^{\hat{}}\exp$$

Where:
h: total drop at the end of the profile
u: distance of the point P considered from the center of the sleeve
lc: total length of the profiled section of the sleeve to which no modification is done
la: total length of the profiled section of the sleeve
exp: exponent larger than 1.

A preferred variant of the design is to have an exponent of 4.

This crowned profile is convex and the reduction of the radius of the sleeve $\Delta H$ (i.e. the amount of decrease in the radius generated by crowning which is called the drop) in a point P is thus defined as follows:

$$\Delta H = h^*((2^*u - lc)/(la - lc))^{\hat{}}\exp$$

The sleeve 20 having an outer convex surface 23E with a crowned profile thus comprises a central flat purely cylindrical surface 230E of length lc having no reduction of diameter and two laterally portions 231E and 232E having a diameter which is progressively reduced from the central portion 230E to the corresponding edge of the sleeve 20. Each portion 231E and 232E may have one circular arc or a combination of several circular arcs having different radii of curvature.

In particular it may be advantageous to adopt a logarithmic profile for the portions 231E and 232E.

In such a case preferably the reduction delta H of the radius of the sleeve with logarithmic profile is given by the following equation:

$$\text{Delta } H = h^*((\ln(1 - ((2^*\min(\text{abs}(u), la/2)/l2)^{\hat{}}\exp)))/(\ln(1 - (l1/l2)^{\hat{}}\exp)))$$

Where h is the total drop at the end of the sleeve profile,
u is the distance of the point from the center of the sleeve,
la is the total length of the profiled section of the sleeve,
exp is an exponent larger than 1,
l1 is a factor calculated as l1=la*k1, and
l2 is a factor calculated as l2=la*k2.
Preferred values are as follows:
k1=0.98
k2=1.02
exp=6.

The logarithmic profile results in less height deviation in the center, while giving more height deviation at the ends of the sleeve, which gives more sensitivity to misalignment but reduces contact pressure in the nominal situation. Compared to a straight bushing on a straight sleeve or a sleeve, of which the edges have been rounded with a constant radius, the logarithmic profile minimizes edge stresses at the ends of the sleeve.

The invention, in particular when a crowned profile is adopted for one of the elements constituted by a sleeve 20 and a bushing 21 of an auxiliary bearing 18, enables to reduce edge stress even in presence of misalignment.

The bushing 21 is preferably made of a material having a hardness of a minimum of 58 on the Rockwell C-Scale and having a heat-treated surface.

The sleeve 20 is preferably made of steel having a heat-treated surface. For example the sleeve 20 may be made of a chromium alloy such as 100Cr6, but other materials are possible.

Figure 8:
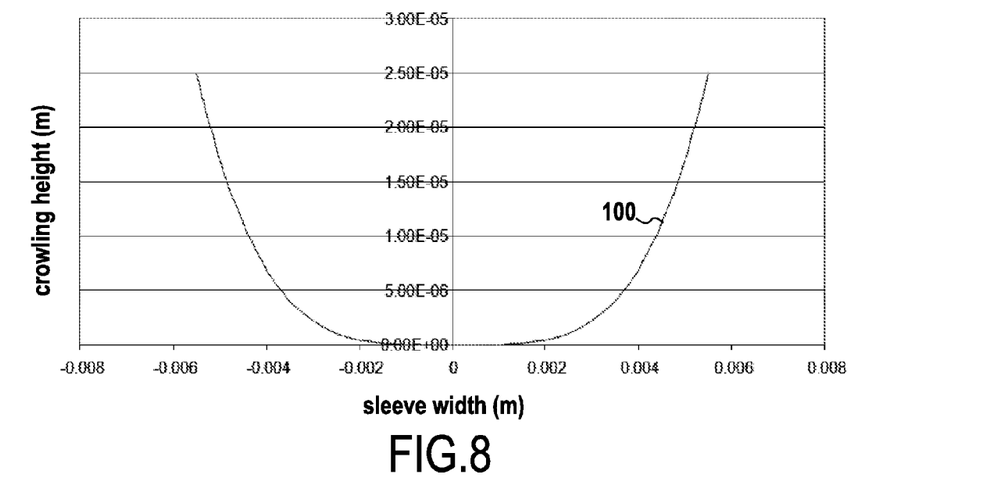
FIG. 8 shows a curve giving the crowning profile as a function of the sleeve width of an auxiliary bearing according to an embodiment of the present invention.

The mean radial air gap (E1) of a radial magnetic bearing used to support the shaft 10 is preferably between 0.2 and 0.5 mm and the minimum clearance (E2) between the sleeve 20 and the bushing 21 is preferably between 0.15 and 0.3 mm FIG. 8 shows a crowning profile for an example sleeve 20 with a diameter of 40 mm and a width of 11 mm. The curve 100 gives the crowning height (m) as a function of the position along the sleeve width (m).

Figure 9:
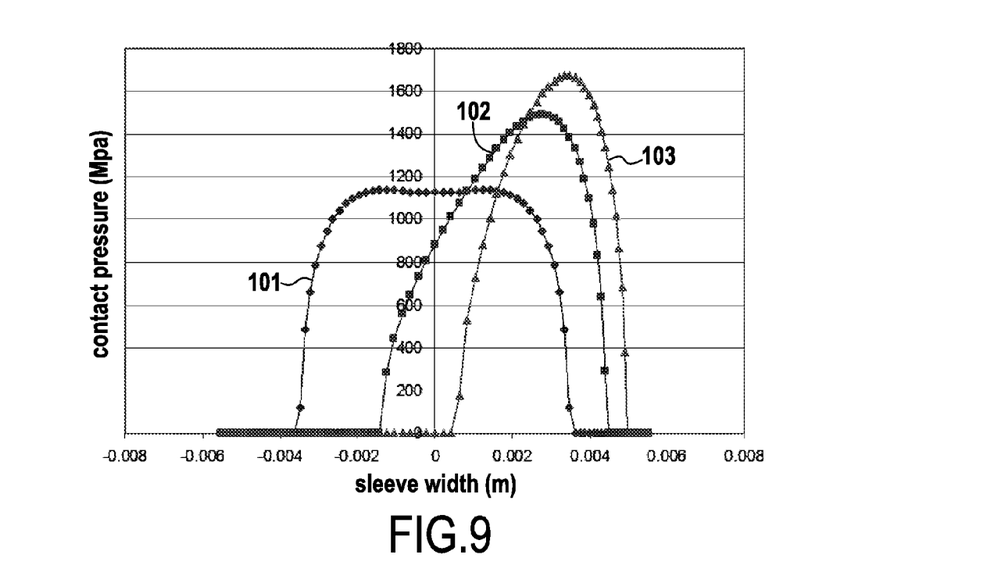
FIG. 9 shows different curves giving the contact pressure as a function of the sleeve width for an auxiliary bearing with different magnitudes of misalignment for a same load.

FIG. 9 shows a contact pressure (MPa) along the sleeve width (mm) of the example of FIG. 8 for different magnitudes of misalignment (angle $\alpha$ between the shaft and the sleeve) with a load of 1200N.

Curve 101 corresponds to a contact pressure without misalignment ($\alpha$=0 mrad).

Curve 102 corresponds to a contact pressure with a slight misalignment ($\alpha$=2 mrad).

Curve 103 corresponds to a contact pressure with a higher misalignment ($\alpha$=4 mrad).

According to the present invention since contact with the edges of the sleeve 20 is avoided when the shaft 10 lands on the sleeve 20 due to a malfunction of the associated magnetic bearing 12, the auxiliary bearing 18 can provide its functionality at a higher speed and load than without the profiling. This allows using sleeve-bushing combinations in applications where this could not be achieved before. This is especially true if the rotary shaft 10 is contacting the auxiliary bearing at an angle.

FIG. 1 shows a single auxiliary bearing 18 and a single radial magnetic bearing 12 cooperating with a portion (usually but not necessarily an end portion) of the rotary shaft 10, but a similar assembly with another similar radial magnetic bearing and another similar auxiliary bearing is used to support another portion of the shaft 10.

It is known that after a drop of a rotary shaft into auxiliary bearings, the rotary shaft can either contact both auxiliary bearings in the same angular position or with an angular offset, i.e. the top of the left auxiliary bearing and the bottom of the right auxiliary bearing. A profiled auxiliary bearing such as proposed according to the present invention is able to cope with a certain degree of such misalignment.

The invention may be combined with self-lubricating features for the sleeve 20.

The invention may be used in a magnetic bearing system where the control electronics and the magnetic bearings are integrated into one unit. This allows reducing the speed of the shaft after a power failure before the rotary shaft is dropped into the auxiliary bearings, since the electronics can power themselves for some time.

The auxiliary bearing according to the invention may be used for different applications, for example in the automotive industry (with bearings of relatively small size), e.g. for small turbo-compressors or in oil and gas industry (with bearings of a larger size), e.g. for motor compressors.

Figure 10:
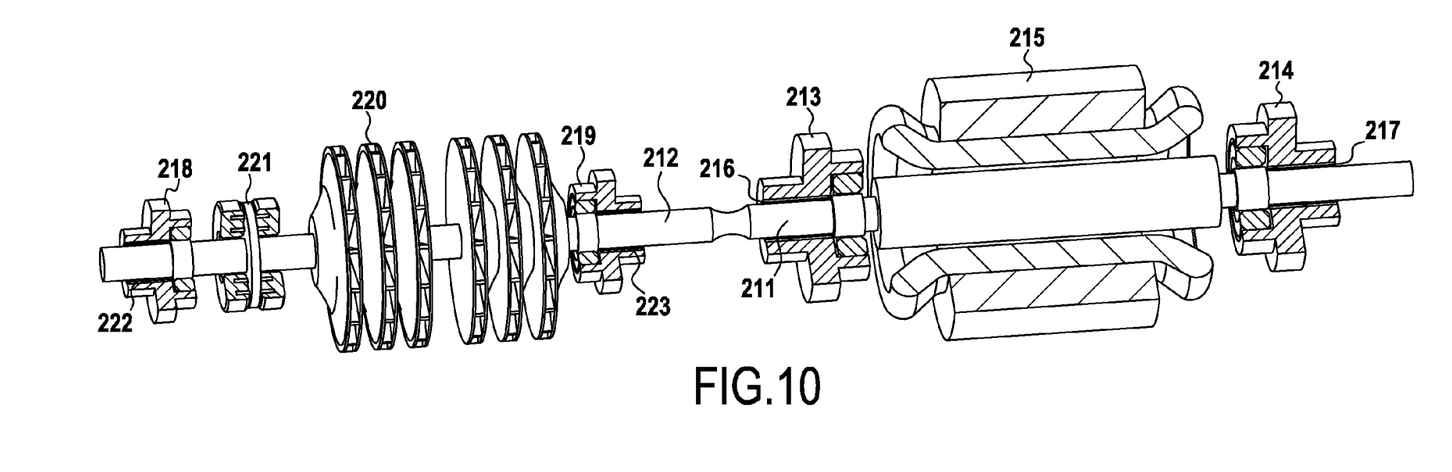
FIG. 10 is a schematic perspective view of an example of an integrated motorized compressor with magnetic bearings and auxiliary bearings.

FIG. 10 shows an example of an integrated motorized compressor comprising a motor shaft 211 and a compressor shaft 212 which may be assembled through a flexible coupling. The motor shaft 211 is rotated by an electric motor 215 and is supported without contact by two radial magnetic bearings 213, 214 which are each associated with an auxiliary bearing 216, 217 respectively. The compressor shaft 212 is equipped with several compressor wheels 220 and is supported without contact by two radial magnetic bearings 218, 219 which are each associated with an auxiliary bearing 222, 223 respectively. Moreover a magnetic thrust bearing 221 is mounted on the compressor shaft 212.

The auxiliary bearings 216, 217, 222, 223, which are usually constituted by ball bearings, may all be designed as sleeve-bushing bearings with the specific profiles of sleeve and bushing which have been mentioned in the above description.

Figure 11:
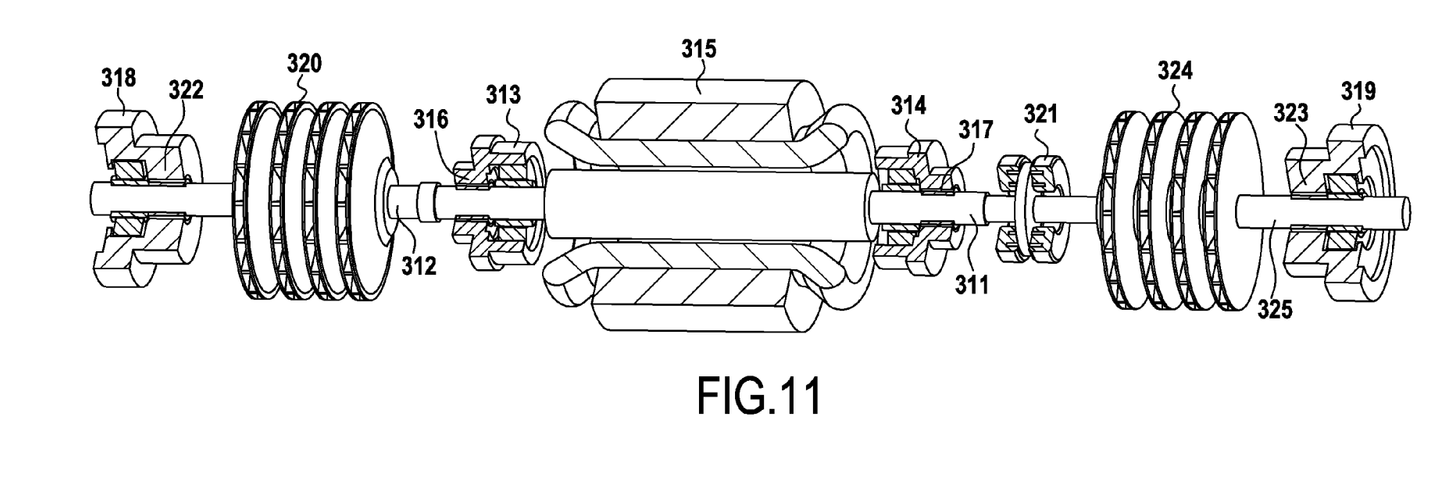
FIG. 11 is a schematic perspective view of an example of another example of sealed motorized compressor with magnetic bearings and auxiliary bearings.

FIG. 11 shows an example of another sealed motorized compressor comprising a motor shaft 311 and two compressor shafts 312, 325 which are assembled through rigid couplings to define a rigid shaft line. The motor shaft 311 is rotated by an electric motor 315 and is supported without contact by two radial magnetic bearings 313, 314 which are each associated with an auxiliary bearing 316, 317 respectively. The first compressor shaft 312 is equipped with several compressor wheels 320 and is supported without contact at its end which is not linked to the motor shaft 311 by one radial magnetic bearing 318 which is associated with an auxiliary bearing 322. The second compressor shaft 325 is equipped with several compressor wheels 324 and is supported without contact at its end which is not linked to the motor shaft 311 by one radial magnetic bearing 319 which is associated with an auxiliary bearing 323. Moreover a magnetic thrust bearing 321 is mounted on the second compressor shaft 325.

The auxiliary bearings 316, 317, 322, 323, which are usually constituted by ball bearings, may all be designed as plain bearings, more specifically as sleeve-bushing bearings with the specific profiles of sleeve and bushing which have been mentioned in the above description.

Although preferred embodiments have been shown and described, it should be understood that any changes and modifications may be made therein without departing from the scope of the invention as defined in the appended claims. Thus the features of the different embodiments may be combined. In particular it is possible to combine a first smooth surface integral with a housing with a second smooth surface defined by a sleeve fastened on a shaft or conversely it is possible to combine a first smooth surface defined by a bushing fastened on a housing with a second smooth surface integral with a rotating shaft, provided the first and second smooth surfaces are heat-treated and the first smooth surface and the second smooth surface each exhibit symmetry around a longitudinal axis of the rotating shaft whilst having different profiles in a longitudinal cross-section including the longitudinal axis.

The invention claimed is:

1. An assembly comprising:
a rotating shaft supported with respect to a stationary housing by at least one active magnetic bearing presenting a mean radial air gap and at least one auxiliary bearing having a first smooth surface integral with the housing and a second smooth surface integral with the rotating shaft,
wherein the first and second smooth surfaces are opposite to each other and define a clearance which is less than the mean radial air gap, and
wherein the first smooth surface and the second smooth surface each exhibit symmetry around a longitudinal axis of the rotating shaft and have different profiles in a longitudinal cross-section including the longitudinal axis,
wherein the second smooth surface comprises a heat-treated surface formed on a sleeve fixedly mounted on the rotating shaft,
wherein the sleeve comprises a profile with a radius defined by reduction delta H given by equation:

$$\text{Delta } H = h^*((2^*u-lc)/(la-lc))^{\wedge}\exp,$$

wherein h is a total drop at an end of the profile,
wherein u is a distance of a point from a center of the sleeve,
wherein lc is a total length of a section of the sleeve to which no modification is done,
wherein la is a total length of the section of the sleeve, and
wherein exp is an exponent larger than 1.

2. The assembly according to claim 1, wherein the first smooth surface comprises a convex profile in the longitudinal cross-section and the second smooth surface comprises a concave profile in the longitudinal cross-section.

3. The assembly according to claim 1, wherein the first smooth surface comprises a concave profile in the longitudinal cross-section and the second smooth surface comprises a convex profile in the longitudinal cross-section.

4. The assembly according to claim 1, wherein the first smooth surface comprises a convex profile in the longitudinal cross-section.

5. The assembly according to claim 1, wherein the first smooth surface comprises a straight profile in the longitudinal cross-section and the second smooth surface comprises a convex profile in the longitudinal cross-section.

6. The assembly according to claim 5, wherein the first smooth surface comprises a heat-treated surface which is directly machined on the housing.

7. The assembly according to claim 6, wherein the second smooth surface comprises a heat-treated surface which is directly machined on the rotating shaft.

8. The assembly according to claim 5, wherein the first smooth surface comprises a heat-treated surface formed on a bushing fixedly mounted on the housing.

9. The assembly according to claim 5, wherein the profile comprises a crowned profile.

10. A radial magnetic bearing device, comprising:
an assembly having a rotating shaft supported with respect to a stationary housing by at least one active magnetic bearing presenting a mean radial air gap and at least one auxiliary bearing having a first smooth surface integral with the housing and a second smooth surface integral with the rotating shaft, wherein
the first and second smooth surfaces are opposite to each other and define a clearance which is less than the mean radial air gap, and wherein
the first smooth surface and the second smooth surface each exhibit symmetry around a longitudinal axis of the rotating shaft and have different profiles in a longitudinal cross-section including the longitudinal axis,
wherein the second smooth surface comprises a heat-treated surface formed on a sleeve fixedly mounted on the rotating shaft,
wherein the sleeve has a profile with a radius defined by reduction delta H given by equation:

Delta $H = h^*((2^*u-lc)/(la-lc))^{\wedge}\exp$, wherein h is a total drop at an end of the profile,
wherein u is a distance of a point from a center of the sleeve,
wherein lc is a total length of a section of the sleeve to which no modification is done,
wherein la is a total length of the section of the sleeve, and
wherein exp is an exponent larger than 1.

11. An assembly comprising:
a rotating shaft supported with respect to a stationary housing by at least one active magnetic bearing presenting a mean radial air gap and at least one auxiliary bearing having a first smooth surface integral with the housing and a second smooth surface integral with the rotating shaft,
wherein the first and second smooth surfaces are opposite to each other and define a clearance which is less than the mean radial air gap, and
wherein the first smooth surface and the second smooth surface each exhibit symmetry around a longitudinal axis of the rotating shaft and have different profiles in a longitudinal cross-section including the longitudinal axis,
wherein the second smooth surface comprises a heat-treated surface formed on a sleeve fixedly mounted on the rotating shaft,
wherein the sleeve comprises a profile with a radius defined by reduction delta H given by equation:

Delta $H = h^*((\ln(1-((2^*\min(abs(u),la/2)/l2)^{\wedge}\exp)))/(\ln(1-(l1/l2)^{\wedge}\exp)))$, wherein h is a total drop at an end of the profile,
wherein u is a distance of a point from a center of the sleeve,
wherein la is a total length of a section of the sleeve,
wherein exp is an exponent larger than 1,
wherein k1 is a factor calculated as $l1=la^*k1$, and
wherein k2 is a factor calculated as $l2=la^*k2$.

12. The assembly according to claim 11, wherein the profile comprises a logarithmic profile.

13. The assembly according to claim 11, wherein the mean radial air gap is between 0.2 and 0.5 mm and the clearance is between 0.15 and 0.3 mm.

14. The assembly according to claim 11, wherein the first smooth surface comprises a convex profile in the longitudinal cross-section and the second smooth surface comprises a concave profile in the longitudinal cross-section.

15. The assembly according to claim 11, wherein the first smooth surface comprises a concave profile in the longitudinal cross-section and the second smooth surface comprises a convex profile in the longitudinal cross-section.

16. The assembly according to claim 11, wherein the first smooth surface comprises a convex profile in the longitudinal cross-section.

17. The assembly according to claim 11, wherein the first smooth surface comprises a straight profile in the longitudinal cross-section and the second smooth surface comprises a convex profile in the longitudinal cross-section.

18. The assembly according to claim 17, wherein the first smooth surface comprises a heat-treated surface which is directly machined on the housing.

19. The assembly according to claim 18, wherein the second smooth surface comprises a heat-treated surface which is directly machined on the rotating shaft.

20. The assembly according to claim 17, wherein the first smooth surface comprises a heat-treated surface formed on a bushing fixedly mounted on the housing.

21. A radial magnetic bearing device comprising the assembly of claim 11.

* * * * *